(12) United States Patent
Dykman et al.

(10) Patent No.: US 6,652,021 B1
(45) Date of Patent: Nov. 25, 2003

(54) INTEGRATED HEADLINER ASSEMBLY

(75) Inventors: Michael C. Dykman, Lake Orion, MI (US); John C. Walters, Knoxville, TN (US); Jason P. Whitman, Canton, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 10/289,068

(22) Filed: Nov. 6, 2002

(51) Int. Cl.⁷ .................................................. B60J 7/00
(52) U.S. Cl. ...................................................... 296/214
(58) Field of Search ................................ 296/214, 208, 296/189; 454/137; 280/751, 748

(56) References Cited

U.S. PATENT DOCUMENTS

| | | | | |
|---|---|---|---|---|
| 4,131,702 A | * | 12/1978 | Alfter et al. ................. | 296/214 |
| 4,211,590 A | * | 7/1980 | Steward et al. ............. | 296/214 |
| 4,600,621 A | * | 7/1986 | Maurer et al. .............. | 296/214 |
| 4,840,832 A | * | 6/1989 | Weinle et al. ............... | 296/214 |
| 4,902,068 A | * | 2/1990 | Dowd et al. ................. | 296/214 |
| 4,981,322 A | * | 1/1991 | Dowd et al. ................. | 296/214 |
| 5,105,521 A | * | 4/1992 | Dowd et al. .................. | 29/214 |
| 5,275,865 A | | 1/1994 | Nicolay | |
| 5,309,634 A | * | 5/1994 | Van Order et al. ........... | 29/863 |
| 5,389,316 A | | 2/1995 | Kerman | |
| 5,492,260 A | * | 2/1996 | Rieden et al. ............... | 224/553 |
| 5,509,247 A | | 4/1996 | Fortez et al. | |
| 5,688,022 A | * | 11/1997 | Adams et al. ............... | 296/214 |
| 5,823,611 A | * | 10/1998 | Daniel et al. ................ | 296/214 |
| 5,833,304 A | * | 11/1998 | Daniel et al. ................ | 296/214 |
| 5,884,962 A | * | 3/1999 | Mattingly et al. .......... | 296/189 |
| 5,885,515 A | | 3/1999 | Hudkins | |
| 5,931,525 A | * | 8/1999 | Rickabus ..................... | 296/214 |
| 5,942,321 A | | 8/1999 | Romesberg et al. | |
| 5,976,295 A | | 11/1999 | Ang | |
| 5,988,735 A | | 11/1999 | Muller | |
| 6,008,149 A | | 12/1999 | Copperwheat | |
| 6,036,227 A | * | 3/2000 | Lin et al. .................... | 296/214 |
| 6,062,635 A | * | 5/2000 | Learman et al. ............ | 296/214 |
| 6,086,145 A | * | 7/2000 | Wandyez ..................... | 296/214 |
| 6,093,272 A | | 7/2000 | Visconti et al. | |
| 6,120,090 A | * | 9/2000 | Van Ert et al. .............. | 296/214 |
| 6,120,091 A | * | 9/2000 | Reich et al. ................. | 296/214 |
| 6,124,222 A | * | 9/2000 | Gebreselassie et al. ..... | 296/214 |
| 6,127,021 A | | 10/2000 | Kelman | |
| 6,135,491 A | * | 10/2000 | Olson et al. ................. | 296/214 |
| 6,136,415 A | | 10/2000 | Spengler | |
| 6,156,682 A | | 12/2000 | Fletemier et al. | |
| 6,176,660 B1 | * | 1/2001 | Lewis et al. .................. | 411/45 |
| 6,180,211 B1 | | 1/2001 | Held | |
| 6,204,209 B1 | | 3/2001 | Rozek et al. | |
| 6,206,669 B1 | | 3/2001 | Lewit et al. | |
| 6,210,613 B1 | | 4/2001 | Stein et al. | |
| 6,214,157 B1 | | 4/2001 | Spengler | |
| 6,214,456 B1 | | 4/2001 | Boyd et al. | |
| 6,227,561 B1 | * | 5/2001 | Jost et al. .................... | 296/214 |

(List continued on next page.)

FOREIGN PATENT DOCUMENTS

WO    WO 01/94155 A1    12/2001

Primary Examiner—Kiran Patel
(74) Attorney, Agent, or Firm—Bill C. Panagos

(57) ABSTRACT

A vehicle headliner assembly includes a first structural member cooperating with a second structural member to form air ducts between them. A portion of the first structural member is covered by a decorative cover that presents an appearance surface to the vehicle passenger compartment. Integrally formed in the second structural member are an energy absorbing structure and an attachment structure. Thus, the headliner assembly eliminates the need for separate air ducts, separate energy absorbing material, and separate wiring harness and hose clamps. The headliner assembly is also configured to facilitate attachment of passenger compartment devices such as grab handles, without the use of separate fasteners or retainers.

20 Claims, 2 Drawing Sheets

U.S. PATENT DOCUMENTS

| | | | |
|---|---|---|---|
| 6,234,570 B1 * | 5/2001 | Quinno et al. | 295/214 |
| 6,248,200 B1 | 6/2001 | Dailey et al. | |
| 6,257,616 B1 * | 7/2001 | Nowak et al. | 296/214 |
| 6,273,499 B1 * | 8/2001 | Guyon | 296/214 |
| 6,279,978 B1 * | 8/2001 | Schreyer et al. | 296/214 |
| 6,338,517 B1 * | 1/2002 | Canni et al. | 296/37.8 |
| 6,422,644 B1 * | 7/2002 | Miller et al. | 296/214 |
| 6,436,854 B1 * | 8/2002 | North et al. | 442/58 |
| 6,475,937 B1 * | 11/2002 | Preisler et al. | 296/214 |
| 2002/0145298 A1 * | 10/2002 | Williams et al. | 296/214 |
| 2002/0190506 A1 * | 12/2002 | Tiesler | 280/730.1 |
| 2002/0190508 A1 * | 12/2002 | Jost | 280/730.2 |
| 2002/0195844 A1 * | 12/2002 | Hipwell | 296/214 |

* cited by examiner

INTEGRATED HEADLINER ASSEMBLY

BACKGROUND OF THE INVENTION

1. Field of the Invention

The present invention relates to a headliner assembly for use in a vehicle.

2. Background Art

For some time, vehicles have become increasingly complex, being equipped with an ever expanding array of devices. Some of these devices are included for safety—e.g., side air bags and energy absorbing components—while others are included primarily for comfort—e.g., infotainment systems and elaborate climate control systems. Often the addition of a new device also requires the addition of one or more associated components.

For example, a climate control system in a large sport utility vehicle (SUV) may require the addition of a complex system of air ducts to facilitate movement of air to all parts of the vehicle passenger compartment. Similarly, onboard infotainment and computer systems may require the routing of additional wiring for power and/or data transfer. Structural members may require the addition of energy absorbing material for impact safety. Even simple devices such as grab handles and the like may require special retainers or fasteners to facilitate attachment in the vehicle passenger compartment. Hence, the cost of material and installation for all of the associated components can become prohibitive.

One method of dealing with this potentially prohibitive cost is to integrate some of the components into an existing component—e.g., a headliner. One attempt to implement such an integration is described in U.S. Pat. No. 6,086,145 issued to Wandyez on Jul. 11, 2000. Wandyez describes a vehicle headliner including a unitary substrate and a decorative cover. Cavities are formed in the substrate to perform a variety of functions. For example, one of the cavities may be defined by a conduit configured to support electrical wiring. Another cavity may be defined by a duct, configured to direct airflow into the vehicle passenger compartment. Still other cavities may be configured as pockets to hold energy absorbing foam.

One limitation of the headliner described in Wandyez is the need to supply an additional safety component within the formed cavities—i.e., energy absorbing foam. In addition, the headliner is not specifically configured for the attachment of interior devices such as grab handles and the like; hence, additional fastening and/or retaining components may be required. Therefore, there still exists a need for a vehicle headliner that integrates energy absorbing structures and provides for the attachment of interior devices without requiring additional fasteners or retainers.

SUMMARY OF THE INVENTION

It is an aspect of the present invention to provide a vehicle headliner assembly that includes integrated fluid passages, thereby eliminating the need for separate air ducts.

It is another aspect of the invention to provide a vehicle headliner assembly that includes integrated energy absorbing structures, thereby eliminating the need for separate energy absorbing material.

It is still another aspect of the invention to provide a vehicle headliner assembly that includes integrated attachment structures configured to receive wiring harnesses and/or washer hoses, thereby eliminating the need for separate harness and hose clamps.

It is another aspect of the present invention to provide a vehicle headliner assembly that includes an integrated means of attaching passenger compartment devices, such as grab handles and the like, thereby eliminating the need for separate fasteners and retainers.

Accordingly, a headliner assembly for a vehicle is provided that comprises a first member having an upper surface and a lower surface. At least a portion of the lower surface is configured with an appearance finish. The headliner assembly further comprises a second member having an upper surface and a lower surface. The upper surface of the second member is configured to be disposed proximate a vehicle roof panel. The lower surface of the second member cooperates with the upper surface of the first member to form a fluid passage therebetween. The second member includes an impact absorption structure and an attachment structure, both integrally formed in the second member.

Another aspect of the invention provides a headliner assembly for a vehicle that comprises a first member having an upper portion and a lower portion attached together. The upper portion provides structural support for the lower portion, and the lower portion is configured with an appearance finish. The headliner assembly further comprises a second member having an upper surface and a lower surface. The upper surface is configured to be disposed proximate a vehicle roof panel, and the lower surface cooperates with the upper portion of the first member to form a fluid passage therebetween. The second member includes an impact absorption structure integrally formed therein, and an attachment structure also integrally formed therein.

Still another aspect of the invention provides a headliner assembly for a vehicle that comprises a first structural member having an upper surface and a lower surface. A second structural member has an upper surface configured to be disposed proximate a vehicle roof panel, and a lower surface that cooperates with the upper surface of the first structural member to form a fluid passage therebetween. The second structural member includes an impact absorption structure integrally formed therein, and an attachment structure also integrally formed therein. The headliner assembly further comprises a decorative cover attached to the lower surface of the first structural component.

The above object and other objects, features, and advantages of the present invention are readily apparent from the following detailed description and best mode for carrying out the invention when taken in connection with the accompanying drawings.

DETAILED DESCRIPTION OF THE PREFERRED EMBODIMENT(S)

Figure 1:
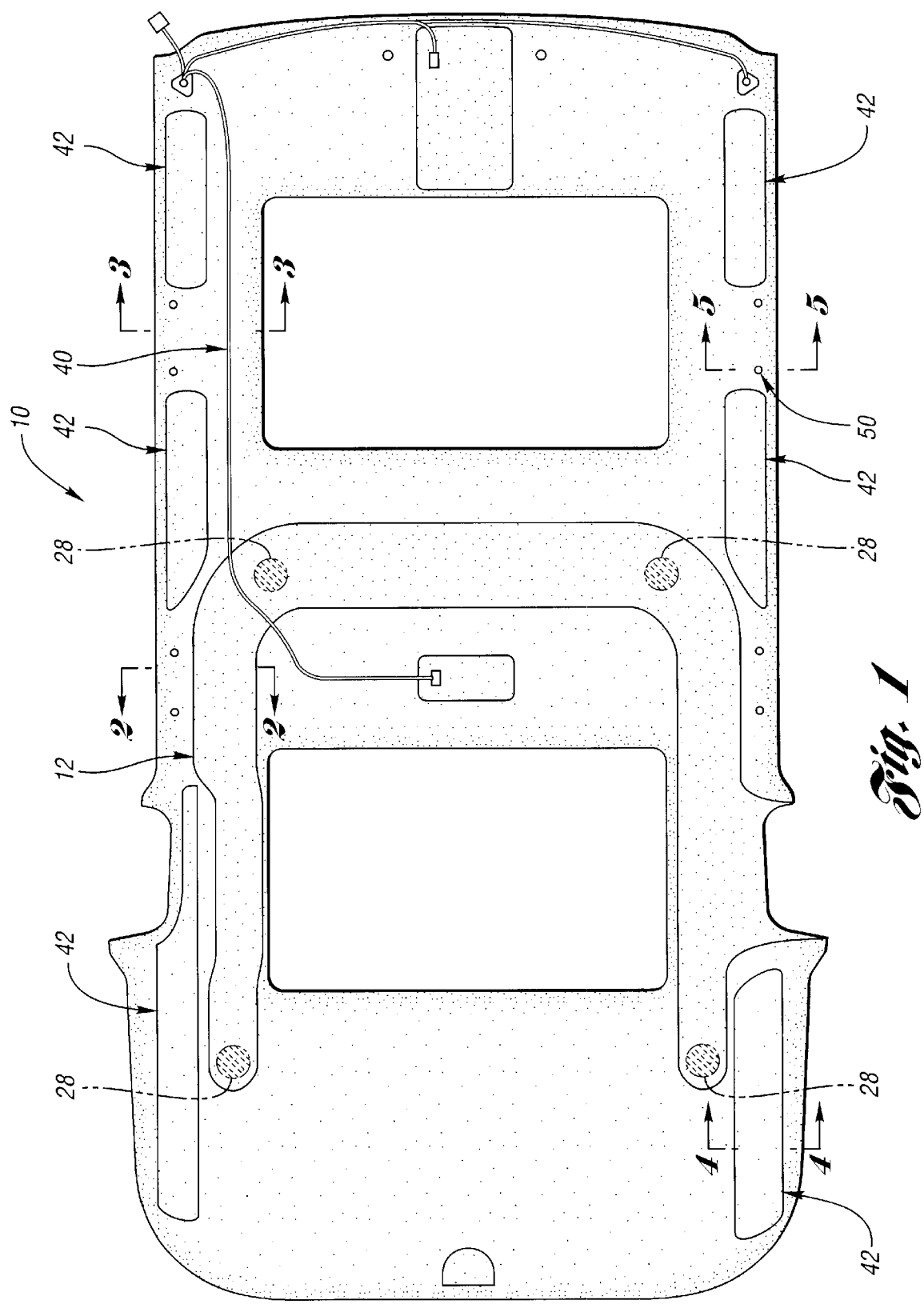
FIG. 1 is an overhead plan view of a vehicle headliner assembly in accordance with the present invention.
Figure 2:
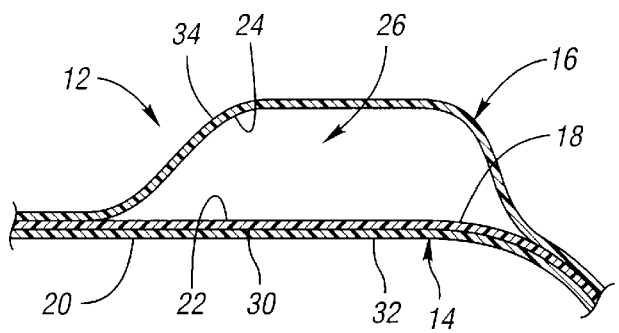
FIG. 2 is a fragmentary sectional view of a portion of the headliner assembly shown in FIG. 1, taken through section line 2—2, showing an air duct integrally formed in the headliner assembly.

FIG. 1 shows an overhead plan view of a vehicle headliner assembly 10 in accordance with the present invention. Various features of the headliner assembly 10 are shown in greater detail in the partial sectional views shown in FIGS. 2–5. For example, FIG. 2, taken through line 2—2 in FIG. 1, shows a portion of an air duct 12 integrated into the headliner assembly 10. The air duct 12 is formed generally between a first member 14 and a second member 16 of the headliner assembly 10. The first and second members 14,16 may comprise one or more portions, such as layers. In the embodiment shown in the figures, the first member 14 includes a first, or upper portion 18, and a second, or lower portion 20.

An upper surface 22 of the first member 14 cooperates with a lower surface 24 of the second member 16 to form a fluid passage 26 in the air duct 12. It is contemplated that the air duct 12 will be attached to a vehicle heating, ventilating, and air conditioning (HVAC) system to facilitate the movement of air throughout the passenger compartment of a vehicle. As seen in FIG. 1, the air duct 12 traverses the width of the headliner assembly 10, such that air may be provided for the comfort of passengers throughout the vehicle passenger compartment. The headliner assembly 10 includes a number of vents 28, shown by hidden lines in FIG. 1, disposed on a side of the headliner assembly 10 facing the vehicle occupants. The vents 28 are adjustable to direct or restrict the flow of air from the duct 12 to individual vehicle occupants. Of course, the configuration of the air duct 12 shown in FIG. 1, represents just one of many different possible configurations. Integrating an air duct into a headliner assembly, such as the air duct 12 in the headliner assembly 10, makes it possible to configure the air ducts when the headliner assembly is manufactured. Thus, many different vehicle makes and models can be accommodated during manufacturing, thereby eliminating the need to route and configure the air ducts during vehicle assembly.

Because it provides structural support for the lower portion 20, the upper portion 18 of the first member 14 can be called a first structural member. In the embodiment shown in the figures, the upper portion 18 is made from a thermoformable rigid urethane (TRU) material, though other suitable materials can be used. The TRU material is bonded to a decorative cover, such as the lower portion 20 of the first member 14. Specifically, the lower portion 20 may comprise a fabric material that is initially attached to a lower surface 30 of the upper portion 18 with an adhesive film. The upper and lower portions 18, 20 are then molded together to form the first member 14. This process is used on many headliner assemblies, and is well known to those in the art. Thus, the lower portion 20 provides the first member 14 with a lower surface 32 having an appearance finish, thereby enhancing the aesthetics of the vehicle passenger compartment.

The second member 16, in the embodiment shown in the figures, comprises a generally rigid material, and therefore, may be called a second structural member. In particular, the second member 16 comprises a thermoplastic composite material based on long chopped glass fibers in a polypropylene matrix. Of course, this is just one material from which a headliner member, such as the second member 16, may be constructed. Other suitable materials include different types of thermoplastics, and even non-thermoplastic materials. The second member 16 is molded such that the lower surface 24 forms a portion of the fluid passage 26, and such that an upper surface 34 can be disposed proximate a vehicle roof panel (not shown).

After the upper and lower portions 18, 20 of the first member 14 are bonded together, and the second member 16 is molded into its desired form, portions of the first and second members 14, 16 are bonded to each other, for example, with an adhesive. As is readily seen in FIG. 2, there is a non-bonded gap that forms the fluid passage 26 of the air duct 12. Thus, the cooperation of the upper surface 22 of the first member 14 and the lower surface 24 of the second member 16 provides integrated air ducts that eliminate the need for separate ducts to be installed in or above a headliner.

Figure 3:
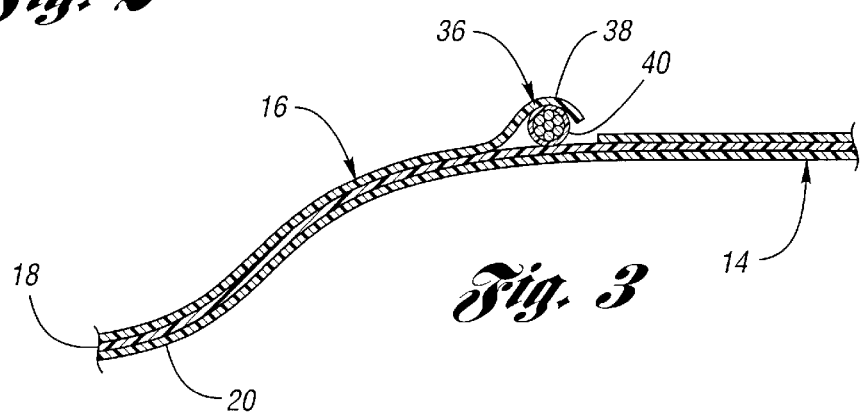
FIG. 3 is a fragmentary sectional view of a portion of the headliner assembly shown in FIG. 1, taken through section line 3—3, showing a clip integrally formed in the headliner assembly.

Turning to FIG. 3, another section of the headliner assembly 10 is shown. This section of the headliner assembly 10 includes an attachment structure, or clip 36. The clip 36 is integrally formed in the second member 16 of the headliner assembly 10, and includes a generally arcuate portion 38 configured to hold a wiring harness 40. Many vehicles today provide washer solvent to a rear window, and the clip 36 may just as easily hold washer hoses or the like. Although section 3—3, shown in FIG. 3, illustrates the headliner assembly 10 at one particular location, clips, such as the clip 36, can be provided throughout the headliner assembly 10 to accommodate a wide variety of attachment requirements. Having a number of clips, such as the clip 36, integrally formed in a headliner assembly, eliminates the need for separate wiring harness attachment devices, such as hot-melt adhesive or tape. Moreover, the second member 16 can be provided with integrally formed attachment structures having different configurations to accommodate different types of attachments.

Figure 4:
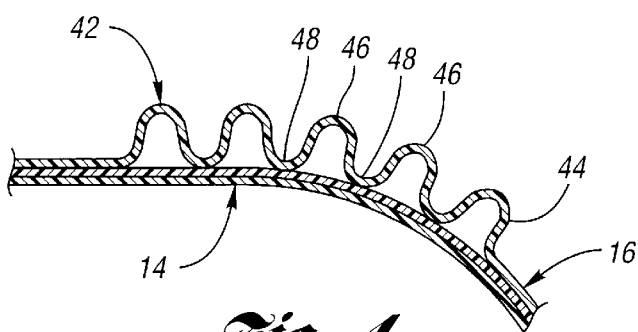
FIG. 4 is a fragmentary sectional view of a portion of the headliner assembly shown in FIG. 1, taken through section line 4—4; showing an energy absorber integrally formed in the headliner assembly.

As seen in FIG. 1, and in cross section in FIG. 4, the headliner assembly 10 also includes impact absorption structures, or energy absorbers 42. The energy absorber 42 comprises an integrally formed corrugated portion 44 of the second member 16 of the headliner assembly 10. This eliminates the need for a separate mass of energy absorbing foam, which is often an adjunct to a headliner assembly, added in a separate operation. Thus, a cost savings in both material and labor may be realized with the headliner assembly 10. As seen in FIG. 4, the corrugated portion 44 may be formed in a configuration that includes a series of waves, each wave having a peak 46 and a valley 48 (as viewed in FIG. 4). The distance between adjacent peaks 46 or adjacent valleys 48 may generally be referred to as a "frequency". Similarly, the distance from a valley 48 to a peak 46 may generally be called an "amplitude". One advantage of having the wave-like configuration is the flexibility in "tuning" the energy absorber 42 to meet desired impact energy absorption levels—e.g., to meet targeted head injury criteria (HIC) levels.

In particular, the energy absorbing capacity of the energy absorber 42 can be modified not only by changing the material from which it is made, or the thickness of the material, but also by changing its configuration. For example, both the frequency and amplitude of the waves on the energy absorber 42, can be configured to provide more or less energy absorbing capacity as desired. Also, the frequency and/or amplitude need not be constant in any one energy absorber; rather, they may be varied as desired to achieve different energy absorbing levels. As seen in FIG. 1, energy absorbers, such as the energy absorbers 42, can be provided in various locations throughout a headliner assembly to further increase passenger safety. In addition, energy absorbers within the same vehicle may be configured with different energy absorbing capacities. Thus, the present invention not only eliminates the need for a separate mass of energy absorbing foam, but also provides a flexibility of design that may otherwise be difficult to achieve with conventional energy absorbers.

Figure 5:
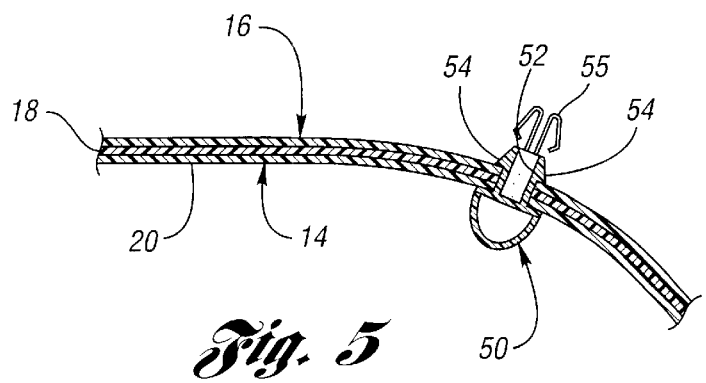
FIG. 5 is a fragmentary sectional view of a portion of the headliner assembly shown in FIG. 1, taken through section line 5—5, showing a grab handle attached directly to the headliner assembly.

FIG. 5 shows a cross section of a grab handle 50 attached directly to a portion of the headliner assembly 10. In particular, a portion of the grab handle 50 is inserted through an aperture 52 in the headliner assembly 10 such that first clips 54 attach to the second member 16, and second clips 55 attach to a vehicle roof rail (not shown). Because of the rigidity of the second member 16, it is possible to at least partially attach grab handles and the like directly to the headliner assembly 10, thereby eliminating the need for a separate retainer or backside bracket. Many conventional headliner assemblies require a separate retainer or fastener to facilitate attachment of vehicle interior components such as a grab handle. This can increase the cost of a vehicle by requiring additional material (the retainer or fasteners), and additional assembly.

Of course, many different types of components can be attached to the headliner assembly 10. For example, grab handles and straps, coat hooks, sun visors, etc. can all be attached to the headliner assembly 10. Moreover, they may be conveniently disposed in many different locations throughout the vehicle passenger compartment. Thus, the embodiment shown in FIGS. 1 and 5 illustrates yet another improvement over conventional headliner assemblies. That is, the headliner assembly 10 facilitates easy attachment of components, and eliminates the cost of separate retainers or fasteners. In addition, separate assembly operations for the retainers or fasteners are also eliminated, and thus an overall cost and time savings may be realized.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A headliner assembly for a vehicle, the headliner assembly comprising:
   a first member having an upper surface and a lower surface, at least a portion of the lower surface being configured with an appearance finish; and
   a second member having an upper surface and a lower surface, the upper surface of the second member being configured to be disposed proximate a vehicle roof panel, and the lower surface of the second member cooperating with the upper surface of the first member to form a fluid passage therebetween, the second member including an attachment structure integrally formed therein, a portion of the second member being formed into an impact absorption structure.

2. The headliner assembly of claim 1, wherein the first member comprises first and second portions attached to each other, the first portion including the upper surface of the first member and providing structural support for the second portion.

3. The headliner assembly of claim 1, wherein the first and second members cooperate to define an aperture extending therethrough, the aperture being configured to receive a vehicle interior component.

4. The headliner assembly of claim 1, wherein the attachment structure is configured to receive a vehicle wiring harness.

5. The headliner assembly of claim 1, wherein the second member comprises a corrugated portion that defines the impact absorption structure.

6. The headliner assembly of claim 1, wherein the second member comprises a thermoplastic composite material.

7. The headliner assembly of claim 1, wherein a portion of the first member is adhesively attached to a portion of the second member.

8. A headliner assembly for a vehicle, the headliner assembly comprising:
   a first member including an upper portion and a lower portion attached together, the upper portion providing structural support for the lower portion, and the lower portion being configured with an appearance finish; and
   a second member having an upper surface and a lower surface, the upper surface being configured to be disposed proximate a vehicle roof panel, and the lower surface cooperating with the upper portion of the first member to form a fluid passage therebetween, the second member including an attachment structure integrally formed therein, a portion of the second member being formed into an impact absorption structure.

9. The headliner assembly of claim 8, wherein the first member comprises a thermoformable rigid urethane material molded with a fabric material.

10. The headliner assembly of claim 8, wherein the first and second members cooperate to define an aperture extending therethrough, the aperture being configured to receive a vehicle interior component.

11. The headliner assembly of claim 8, wherein the attachment structure is configured to receive a vehicle wiring harness.

12. The headliner assembly of claim 8, wherein the second member comprises a corrugated portion that defines the impact absorption structure.

13. The headliner assembly of claim 8, wherein the second member comprises a thermoplastic composite material.

14. The headliner assembly of claim 8, wherein a portion of the first member is adhesively attached to a portion of the second member.

15. A headliner assembly for a vehicle, the headliner assembly comprising:
   a first structural member having an upper surface and a lower surface;
   a second structural member having an upper surface configured to be disposed proximate a vehicle roof panel, and a lower surface cooperating with the upper surface of the first structural member to form a fluid passage therebetween, the second structural member including an attachment structure integrally formed therein, a portion of the second structural member being formed into an impact absorption structure; and
   a decorative cover attached to the lower surface of the first structural member.

16. The headliner assembly of claim 15, wherein the first and second structural members cooperate to define an aperture extending therethrough, the aperture being configured to receive a vehicle interior component.

17. The headliner assembly of claim 15, wherein the attachment structure includes a generally arcuate portion configured to receive a vehicle wiring harness.

18. The headliner assembly of claim 15, wherein the second structural member comprises a corrugated portion that defines the impact absorption structure.

19. The headliner assembly of claim 15, wherein the second structural member comprises a thermoplastic composite material.

20. The headliner assembly of claim 15, wherein a portion of the first structural member is adhesively attached to a portion of the second structural member.

* * * * *